Figure 1:
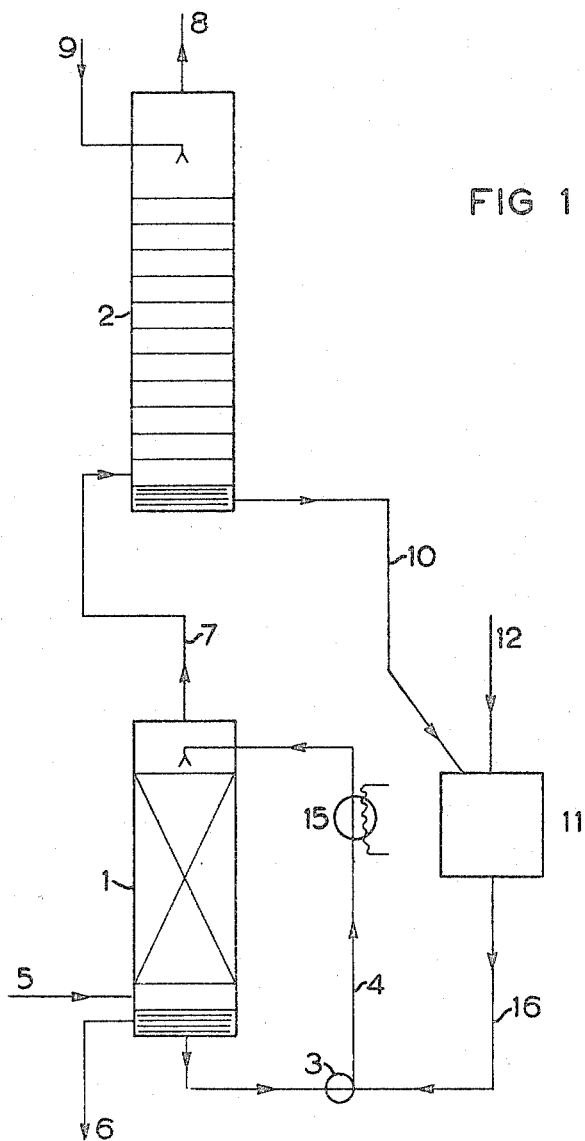

3,289,391
PROCESS FOR PREPARING CONCENTRATED
FORMALDEHYDE SOLUTIONS
Abraham H. De Rooij, Geleen, and Pierre A. M. Aggenbach, Brunssum, Netherlands, assignors to Stamicarbon N.V., Heerlen, Netherlands
Filed Sept. 18, 1964, Ser. No. 397,444
Claims priority, application Netherlands, Sept. 23, 1963, 298,226
13 Claims. (Cl. 55—89)

The present invention relates to a process for preparing concentrated formaldehyde solutions, which are known per se, containing only a little water and consisting substantially of a mixture of formaldehyde and a monohydric or polyhydric alcohol, in which part of the formaldehyde is present in free solution, the remainder being bound to the alcohol as hemiformal. Concentrated formaldehyde solutions of this type have the advantage of containing more formaldehyde than a normal commercial formaline with about 37% by weight of formaldehyde, and also of containing formaldehyde and water in a weight ratio of formaldehyde to water that is up to 5 to 10 times greater than in the normal commercial formaline. This means considerably more concentrated formaldehyde solution which is considerably drier than presently available, and consequently, a considerable saving in the costs of transport and processing.

The concentrated formaldehyde-alcohol solutions are used, for instance, in the preparation of urea-formaldehyde resins and lacquers.

In the past, commercial concentrated formaldehyde-alcohol solutions for these purposes have been prepared by absorbing formaldehyde vapors containing little water in a monohydric or polyhydric aliphatic alcohol, while cooling. In this process the necessary formaldehyde vapor containing little water has been obtained by evaporating an aqueous formaldehyde solution and treating the resulting vapor mixture of water vapor and formaldehyde vapor to condense the major portion of the water vapor therefrom. In other instances, paraformaldehyde has been used as the starting material. This was depolymerized by heating, producing formaldehyde vapors containing hardly any water vapor (see e.g., British Patent No. 714,821).

The present invention provides an improved process for the preparation of concentrated formaldehyde solutions from formaldehyde and alcohol, which process, in contrast to those previously used, utilizes a direct absorption in alcohol of formaldehyde synthesis gas containing water. The formaldehyde synthesis gas is the gas mixture obtained in the known catalytic oxidation of methanol with an excess amount of air.

It is accordingly an object of this invention to provide a process whereby the formaldehyde content of ordinary formaldehyde synthesis gas may be absorbed directly into an aqueous alcohol solution to form a concentrated formaldehyde solution, as described.

More particularly it is an object of this invention to provide a process and system for the removal of the formaldehyde content from formaldehyde synthesis gas by absorbing the same in aqueous alcohol liquid solutions in at least two stages whereby concentrated formaldehyde solutions may be continuously obtained.

In the aforementioned formaldehyde synthesis gas mixtures the weight ratio between formaldehyde and water is generally about 1:1 and usually within the range of 0.75:1 to 1.66:1. In addition to formaldehyde and water vapor, the gas mixture contains a very large amount of nitrogen, some oxygen, and other components. A characteristic composition analysis (expressed in percent by volume) for such a gas mixture is, for instance,

| | |
|---|---|
| $N_2$ | 76.2 percent |
| $O_2$ | 7.4 percent |
| $HC\overset{O}{\underset{H}{\diagdown}}$ | 5.6 percent |
| $H_2O$ | 8.7 percent |
| $CO$ | 2.0 percent |
| $CH_3OH$ | 0.1 percent |

In the practice of the process of this invention, generally any alcohol capable of forming a hemiformal with formaldehyde and having a boiling point above 80° C. at 1 atm. may be used.

Consequently, the term "alcohol" as used in the following specification and claims is directed to and intended to embrace alkyl monohydric and polyhydric alcohols, e.g., n-propyl alcohol, butyl alcohols, amyl alcohols, ethylene glycol, glycerol, and also alicyclic alcohols, such as cyclohexanol, and aromatic alcohols, e.g. benzyl alcohol. Thus, these alcohols meeting the foregoing requirements are generally the lower alkanols having from 1 to 3 hydroxyl groups, the lower cyclic alkanols of 5 to 6 membered rings, and the monocyclic carbocyclic aralkanols of 1 to 3 carbon atoms in the hydroxyl-substituted side chain. Mixtures of such alcohols may also be used.

The invention also renders it possible to prepare, in a continuous absorption process, starting from formaldehyde synthesis gas, a concentrated formaldehyde-containg solution which contains about 5 moles of formaldehyde per mole of alcohol and about 5–40% by weight of water. The absorption of the formaldehyde from the synthesis gas is virtually quantitative in this process, so that for the preparation of the desired concentrated solutions it is now no longer necessary first to convert the formaldehyde synthesis gas to a solution of formaldehyde in water or to paraformaldehyde and only thereafter to recover from these products formaldehyde vapors containing little water vapor.

According to the practice of this invention the formaldehyde present in formaldehyde synthesis gas is continuously absorbed in an absorption system which comprises more than one stage. The formaldehyde synthesis gas is washed in a first absorption stage with a countercurrent circulating, water-containing liquid mixture of formaldehyde and alcohol, and subsequently washing the gas from the first stage, which is now largely freed from formaldehyde, in a final absorption stage with water or a dilute aqueous alcohol solution, also in countercurrent flow, forming a dilute formaldehyde solution. This resulting dilute formaldehyde solution, from the said final absorption stage, is added together with an additional amount of alcohol, to the circulating washing liquid used in the first absorption stage. The washing liquid circulating in the first absorption stage is continuously discharged at a metered rate such that the liquid discharged therefrom per unit time contains about the same quantity of formaldehyde and alcohol as has been added per unit time to the entire absorption system. The amounts of water, alcohol and formaldehyde vapor supplied to the system are so balanced that the washing liquid circulating in the first absorption stage always contains 5–40% by weight of water, and not more than 5 moles of formaldehyde per mole of alcohol.

The absorption columns employed in the practice of this invention are those known to the art. The simplest form for the first absorption stage is an absorption column filled with packing bodies, and a suitable final absorption stage is a column equipped with plates. However, it is also possible to use a plate column instead of a packed column, and vice versa.

To facilitate a virtually complete absorption of the formaldehyde which is not absorbed in the first absorption stage, and to limit the size of the final absorption stage, it is preferred to use an intermediate absorption stage. In this procedure, the gas coming from the first absorption stage, which gas still contains some formaldehyde, is washed with a countercurrent circulating dilute solution containing formaldehyde, alcohol and water. Make-up washing liquid is continuously supplied to the intermediate stage, this make-up liquid comprising the solution discharged from the final absorption stage. The washing liquid is continuously discharged from this intermediate stage at such a rate that the amount of liquid discharged per unit time contains about the same amount of formaldehyde and alcohol as is supplied to the intermediate absorption stage per unit time. The thus discharged liquid is then supplied to the first absorption stage, after addition of alcohol if necessary.

The heat of reaction released from the absorption of the formaldehyde vapors is removed through cooling of the circulating washing liquids. Preferably, the temperature in the absorption stages is maintained between about 40 and 70° C. at normal pressures. If the temperature is lower than about 40° C. there is the danger that too much water will be condensed from the formaldehyde synthesis gas, preventing recovery of the desired highly concentrated formaldehyde solution. At higher temperature above about 70° C. a virtually complete absorption of the formaldehyde supplied is hardly possible, unless the absorption is carried out at elevated pressure.

Figure 2:
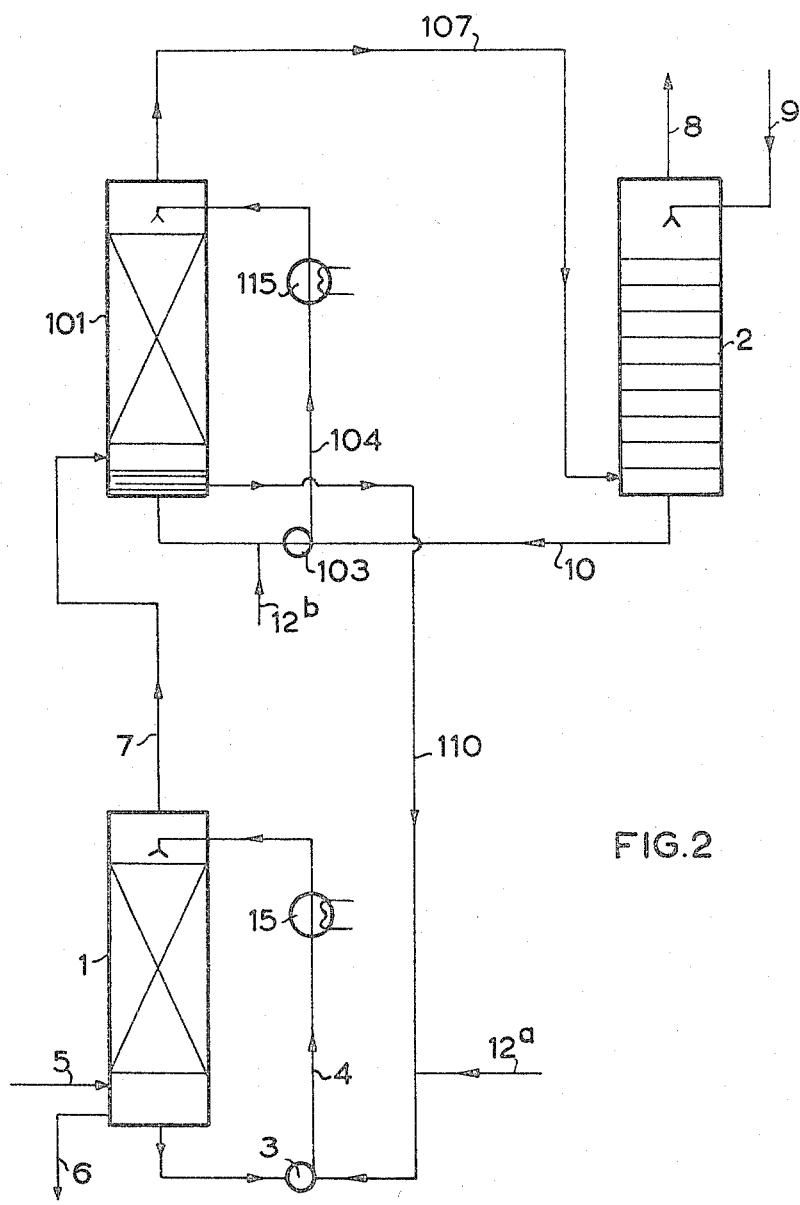

Two absorption systems that can be used in the practice of the invention are schematically illustrated in FIGURES 1 and 2.

FIGURE 1 illustrates a system comprising first and final absorption stages.

FIGURE 2 relates to a system including a third, intermediate, absorption stage, in addition to the first and final stages.

The first absorption stage shown in each of these figures comprises an absorption column 1, over which the liquid absorption/washing solution is circulated by means of pump 3 and conduit 4. The heat of absorption is removed through heat exchanger 15, so that the solution temperature is maintained as desired. The formaldehyde synthesis gas is supplied through conduit 5, and the resulting concentrated formaldehyde solution product is discharged from the system through conduit 6.

At the top of the column 1 gases which have been treated therein but which still contain formaldehyde are led out through conduit 7.

The final absorption stage is represented by column 2, to which water is continuously supplied through conduit 9. The residual vent gases which are now essentially free of formaldehyde leave this column through conduit 8.

The dilute formaldehyde solution which is produced in the final stage by absorption of the formaldehyde content of the gases delivered through conduit 7, is discharged through conduit 10. According to the system of FIGURE 1 this dilute solution flows into a mixing tank 11, to which alcohol is also supplied via supply conduit 12. The resulting solution mixture prepared in mixing vessel 11 is returned through conduit 16 into the flow of liquid circulating over and through column 1.

In the system shown in FIGURE 2 the dilute formaldehyde solution obtained in the final absorption stage 2 is carried through conduit 10, to the intermediate absorption stage comprising an absorption column 101 over which the absorption liquid is circulated via pump 103 and conduit 104. The heat of reaction of absorption is removed through heat exchanger 115, adjusted for control of the temperature of the liquid. The scrubbed gases delivered from this intermediate absorption column 101 are then supplied to the final absorption stage column 2 through conduit 107, while through conduit 110 part of the absorption liquid from column 101 is supplied in a continuous stream through conduit 110 to the absorption solution circulating over column 1. Make-up alcohol is supplied through conduit 12a and/or conduit 12b.

The process according to the system of FIGURE 1 is more suitable for the preparation of formaldehyde-alcohol solutions containing a relatively high portion of water, e.g., more than 25% by weight. In such cases a relatively low volatile alcohol component is added to the liquids to improve the absorption reaction. The process according to the diagram given as FIGURE 2 is satisfactory for the preparation of formaldehyde-alcohol solutions containing relatively little water. In this system the alcohol employed may be much more volatile.

*Example 1*

In a process according to the diagram of FIGURE 2, a synthesis gas mixture having a temperature of 135° C. and a pressure 1.07 atm. is fed into column 1 at the rate of 19,700 m.$^3$ per hour. This gas mixture contains 1050 kg. of formaldehyde, 985 kg. of water vapor, the remaining content being mainly nitrogen and oxygen.

An absorption solution of the following composition:

40.0% by weight of formaldehyde
53.0% by weight of butyl alcohol ($C_4H_9OH$)
7.0% by weight of water is circulated over column 1 at the rate of $2 \times 10^5$ kg. per hour. This solution contains 1.86 moles of formaldehyde per mole of alcohol.

In column 1 formaldehyde is absorbed at the rate of 731 kg. per hour, so that the absorption efficiency of the first absorption stage is 70%. The gases leaving the column have a temperature of 56° C. In column 101 formaldehyde is absorbed from these gases at the rate of 223 kg. per hour, by an absorption solution having the following composition:

13.1% by weight of formaldehyde
7.6% by weight of water
79.3% by weight of butyl alcohol which solution circulates over the column at the rate of $10^5$ kg. per hour.

The gases leaving column 101 are subjected to an absorption process in column 2 by washing them with a 10% solution of butanol in water, running in counterflow, at the rate of 143 kg. per hour. In this solution 96 kg. of formaldehyde, 842 kg. of butanol and 54 kg. of water are absorbed. The mean temperature prevailing in column 2 is 45° C. Through conduit 12b butyl alcohol is supplied at the rate of 1825 kg. per hour to the liquid (temperature 51° C.) circulating over absorption column 101, and through conduit 110 per hour a solution containing 319 kg. of formaldehyde, 184 kg. of water and 1930 kg. of butyl alcohol is added to the washing liquid circulating over column 1. Through conduit 6 formaldehyde concentrate—the recovered product—is drawn from column 1 at the rate of 2624 kg. per hour (1050 kg. of formaldehyde, 184 kg. of water, 1390 kg. of butyl alcohol).

The gas mixture flowing out through conduit 8 is virtually free of formaldehyde, but still retains a considerable amount of butyl alcohol vapor, which butyl alcohol can be recovered by further absorption in water at a lower temperature and distillation of the resulting dilute alcohol solution, and it can then be returned into the absorption system.

Example 2

In the absorption system according to FIGURE 2 the same formaldehyde synthesis gas mixture is absorbed by means of cyclohexanol.

The liquid circulating over column 1 likewise contains 1.86 moles of formaldehyde per mole of cyclohexanol, and is composed of 30.2% by weight of formaldehyde
53.6% by weight of cyclohexanol
16.2% by weight of water In column 1 formaldehyde is absorbed at the rate of 822 kg. per hour, so that the absorption efficiency is 78%. The gases leaving the column have a temperature of 50° C.

In column 101 formaldehyde is absorbed from these gases at the rate of 91 kg. per hour by an absorption liquid having the following composition:

26.2% by weight of formaldehyde
65.0% by weight of water
8.8% by weight of cyclohexanol at an average temperature of 50° C.

The gases leaving column 101, which are virtually free of cyclohexanol, are washed in column 2 with water running in counterflow at the rate of 180 kg. per hour, in which process 137 kg. of formaldehyde, 10 kg. of cyclohexanol, and 385 kg. of water vapor are dissolved. The gases leave column 3 at a temperature of 35° C.

Through conduit 12a, cyclohexanol is supplied at the rate of 1870 kg. per hour to the washing liquid circulating over absorption column 1 ($2 \times 10^5$ kg./hr.), while through conduit 110 869 kg. of solution (228 kg. of formaldehyde, 565 kg. of water, 76 kg. of cyclohexanol) flows over per hour from column 101 into the washing liquid of column 1.

Through conduit 6, formaldehyde concentrate—the recovered product—is removed from the system at the rate of 3485 kg. per hour, this amount including 1050 kg. of formaldehyde and 1870 kg. of cyclohexanol.

The concentrated formaldehyde-alcohol-water mixtures prepared direct from formaldehyde synthesis gas by the process according to the invention are suitable for use in the preparation of synthetic resins and glues, e.g., those based on urea and formaldehyde.

They are also suitable as starting material in the preparation of water-free monomeric formaldehyde vapors by a process in which water is first removed by distillation, and next the resulting formaldehyde-alcohol mixture is thermally decomposed while the alcohol vapor is condensed, or the alcohol and formaldehyde vapors are separated by means of extractive distillation.

The formaldehyde-containing solutions prepared by the process according to the invention can also be used for the preparation of a solid formaldehyde polymer by first removing the water by distillation and cooling the remaining formaldehyde-alcohol mixture to, say, 10° C., so that a solid, water-soluble formaldehyde polymer is formed. By preference, the pH value of the mixture to be cooled will be maintained at 8–9, as it has been found that the product formed in this case can be easily filtered. For instance, the mixture of formaldehyde, n-butyl alcohol and water, obtained in the way described in Example 1, was used in a process in which, after the water had been removed by distillation and the remaining formaldehyde-butanol had been cooled at 10° C. and at a pH value of 8.5, a solid formaldehyde was obtained, which after washing with diethyl ether contained 95–96 percent of formaldehyde and 5–4 percent of bound n-butyl alcohol.

We claim:

1. Continuous process for the direct recovery of formaldehyde, in the form of a concentrated aqueous-alcohol solution, from formaldehyde synthesis gas, which process consists essentially in
    (A) introducing continuously a supply of formaldehyde synthesis gas into a first absorption stage of an absorption system,
        scrubbing said gas in said first stage with a continuously circulating countercurrent flow of a first liquid mixture of formaldehyde and alcohol, and a minor amount of water, whereby at least a major portion of the formaldehyde content of said synthesis gas is absorbed in said first liquid,
    (B) thereafter introducing at least a portion of the remainder of said synthesis gas from which said formaldehyde has been removed in said first stage into a final absorption stage of said absorption system,
        scrubbing said portion of said synthesis gas therein with a countercurrent-flowing second liquid, containing alcohol, whereby substantially all remaining portions of the formaldehyde content of said gas are absorbed in said second liquid, and
    (C) introducing an added amount of alcohol, and delivering said second liquid, containing absorbed formaldehyde from said final stage, to said circulating first liquid mixture of said first absorption stage,
        while withdrawing portions of said first liquid mixture circulating in said first absorption stage as the desired concentrated aqueous solution of formaldehyde,
            at a rate and in an amount such that the solution thus discharged removes the formaldehyde and alcohol from said system at substantially the same rate the formaldehyde and alcohol are introduced thereinto, and while balancing the amount of water, alcohol and formaldehyde supplied to the system,
    so that said first aqueous liquid mixture circulating in said first absorption stage is maintained at a composition containing from 5% to 40% by weight of water with from about 0.5 mols to at most about 5 mols of formaldehyde per mol of alcohol.

2. The process of claim 1 wherein the temperature of the said aqueous liquid mixture circulating in said first stage is maintained in the range between about 40° C. and about 70° C., at normal pressure.

3. The process of claim 2 wherein said temperature is maintained by indirect heat exchange and cooling of said first circulating liquid mixture.

4. The process of claim 1 wherein said first liquid mixture is cooled while circulating outside of said first absorption stage.

5. The process of claim 4 wherein second aqueous alcohol liquid and said added amount of alcohol are introduced into said first liquid while the same is circulating outside of said first absorption stage.

6. The process of claim 1 wherein the said alcohol employed is an alcohol capable of forming a hemiacetal with formaldehyde and which has a boiling point in excess of 80° C. at atmospheric pressure.

7. The process of claim 1 wherein said alcohol is selected from the class consisting of monohydric and polyhydric lower alkanols, lower cyclic alkanols, and monocyclic carbocyclic aralkanols.

8. The process of claim 7 wherein a mixture of said alcohols is employed.

9. The process of claim 7 wherein said alcohol is cyclohexanol.

10. The process of claim 7 wherein the alcohol is butyl alcohol.

11. The process of claim 1 wherein said absorption system also includes an intermediate absorption stage and the said remainder of said synthesis gas from said first absorption stage is introduced from said first stage into said intermediate stage,
    scrubbing said gas in said intermediate stage with a countercurrent flowing intermediate liquid containing formaldehyde and alcohol, and said second aqueous liquid containing formaldehyde and alcohol discharged from said final absorption stage is continuously supplied to said intermediate stage as make-up scrubbing liquid therein, and continuously removing the said intermediate aqueous liquid from said intermediate stage at a rate and in an amount such that formaldehyde and alcohol leave said intermediate stage at substantially the same rate that formaldehyde and alcohol are introduced thereinto, the intermediate scrubbing liquid thus discharged being delivered to the said circulating first liquid mixture for said first absorption stage.

12. The process of claim 11 wherein said intermediate aqueous liquid used in said intermediate stage contains alcohol supplied to said second aqueous solution obtained from said final absorption stage.

13. The process of claim 12 wherein the said added amount of alcohol introduced into said first circulating aqueous liquid mixture of said first absorption stage is at least partly introduced between said first and said second intermediate absorption stages.

References Cited by the Examiner

UNITED STATES PATENTS

| 3,067,177 | 12/1962 | Greco et al. | 55—83 X |
| 3,214,891 | 11/1965 | Kloeper et al. | 55—84 X |

FOREIGN PATENTS

| 566,884 | 12/1958 | Canada. |
| 1,362,398 | 4/1964 | France. |

SAMIH N. ZAHARNA, *Primary Examiner.*

REUBEN FRIEDMAN, *Examiner.*

J. W. ADEE, *Assistant Examiner.*